United States Patent [19]

Sperry

[11] 4,196,160
[45] Apr. 1, 1980

[54] METHOD AND APPARATUS FOR FORMING FOAM CUSHIONS

[75] Inventor: Charles R. Sperry, Wilton, Conn.

[73] Assignee: Sealed Air Corporation, Saddle Brook, N.J.

[21] Appl. No.: 936,743

[22] Filed: Aug. 25, 1978

[51] Int. Cl.$^2$ ............................................. B29D 27/04
[52] U.S. Cl. .................................... 264/40.4; 264/51; 264/239; 264/294; 264/299; 264/321; 264/DIG. 66; 425/112; 425/145; 425/817 C
[58] Field of Search .................. 264/51, 54, 321, 294, 264/296, 299, 301, 245, 284, 73, DIG. 66, 40.4, 239; 425/145, 112, 817 C

[56] References Cited

U.S. PATENT DOCUMENTS

| | | | |
|---|---|---|---|
| 3,012,283 | 12/1961 | Foster | 264/321 X |
| 3,079,641 | 3/1963 | Knox et al. | 264/54 |
| 3,311,069 | 3/1967 | Underwood | 264/296 X |
| 3,405,215 | 10/1968 | Caldwell | 264/299 X |

FOREIGN PATENT DOCUMENTS

| | | | |
|---|---|---|---|
| 2424322 | 11/1975 | Fed. Rep. of Germany | 264/51 |
| 1025972 | 4/1966 | United Kingdom | 264/51 |

*Primary Examiner*—Philip Anderson
*Attorney, Agent, or Firm*—Lerner, David, Littenberg & Samuel

[57] ABSTRACT

A method and apparatus is provided for forming a cushion from foam plastic material by first depositing separate masses of foam material, each having a predetermined configuration, onto a moving transfer surface at a depositing station. While the masses of material are being transferred to a forming station, they rise to a tack-free state and reach substantially full expansion during a predetermined time period which is less than the time which it takes the foam material to set. Then, before the foam material does set, each mass of foam material is individually shaped at the forming station into a predetermined configuration by employing force-applying elements to press each of the masses of foam material into the predetermined configuration while on the transfer surface. Once the mass of foam material has been shaped and set, the force-applying elements are released. The cushions are being formed continuously, since while a first mass of material is being deposited at the depositing station, a second mass is on its way to the forming station, and a third previously-deposited mass of material is being shaped at the forming station.

13 Claims, 7 Drawing Figures

METHOD AND APPARATUS FOR FORMING FOAM CUSHIONS

FIELD OF THE INVENTION

The present invention relates generally to the forming of foam plastic cushions, and specifically to a method and apparatus for continuously forming foam cushions on a conveyor apparatus without employing closed molds, thus increasing production speed and lowering production costs by eliminating the need for such molds.

BACKGROUND OF THE INVENTION

It is well known in the art to form articles into a desired shape from foam plastic material, such as polyurethane. Typically, closed molds having the desired configuration are employed to form and shape the foam material into the desired configuration. However, such prior art methods have the drawback of being relatively slow in operation and result in relatively high production costs. In addition, as closed molds are employed to shape the foam articles, additional expenses are required to purchase the necessary molds.

It is also known in the prior art to form foam material into a desired shape without using closed molds. For example, in U.S. Pat. No. 3,079,641, there is disclosed a method of molding polyurethane foam by shaping it without compression. In this prior art patent, the foam material is continuously deposited onto a moving conveyor to form a continuous length of foam material having the desired cross-sectional configuration.

However, the prior art does not disclose a method of and apparatus for depositing and forming separate masses of foam material into articles having a predetermined desired configuration.

Broadly, it is an object of the present invention to provide a method and apparatus for performing the foregoing. Specifically, it is within the contemplation of the present invention to provide a continuous system for depositing separate masses of foam material having a predetermined configuration onto a moving transfer surface, allowing them to rise to a tack-free state as they are transferred to a forming station, and then individually shaping each of the masses of foam material into a predetermined configuration without using closed molds so as to increase production speed and to lower the product cost.

It is a further object of the present invention to provide a continuous system for depositing a separate mass of foam material onto a moving conveyor while a previously-deposited mass of material is being shaped and formed at a forming station, so that such a continuous method of forming separate masses of foam material into articles having a desired configuration lowers production costs and eliminates the need for and expense of closed molds.

SUMMARY OF THE INVENTION

Briefly, in accordance with the principles of the present invention, an improved method and apparatus are provided for forming a cushion from foam plastic material which includes means for depositing separate masses of foam material, each having a predetermined configuration, onto a conveyor apparatus at a depositing station. While the masses of foam material are being transferred by the conveying apparatus to a forming station, the foam material rises to a tack-free state and reaches substantially full expansion. The distance between the depositing station and forming station and the speed of the conveying apparatus are adjusted such that the masses of deposited foam material reach the forming station before the foam material sets. At the forming station, each of the masses of foam material is individually shaped into a predetermined configuration by employing force-applying means to press each of the masses of foam material into the desired predetermined configuration while they are on the conveying apparatus. The force-applying means is then released after the mass of foam material has been shaped and the conveying apparatus moves it from the forming station.

Advantageously, as a result of the present invention, discrete articles, such as cushions, can be quickly and inexpensively produced, since the need for closed molds has been eliminated. In addition, the apparatus of the present invention allows the masses of foam material to be deposited, transferred, and formed in a continuous manner, since a mass of foam material is being deposited at the depositing station while a previously-deposited mass of material is being transferred to the forming station and while still another mass of material is being shaped and formed at the forming station. Advantageously, such a continuous system allows the foam articles to be quickly produced at a relatively low cost.

BRIEF DESCRIPTION OF THE DRAWINGS

Further objects, features, and advantages of the present invention will become apparent upon the consideration of the following detailed description of a presently-preferred embodiment, when taken in conjunction with the accompanying drawings, wherein.

DETAILED DISCUSSION OF PREFERRED EMBODIMENT OF THE INVENTION

Figure 1:
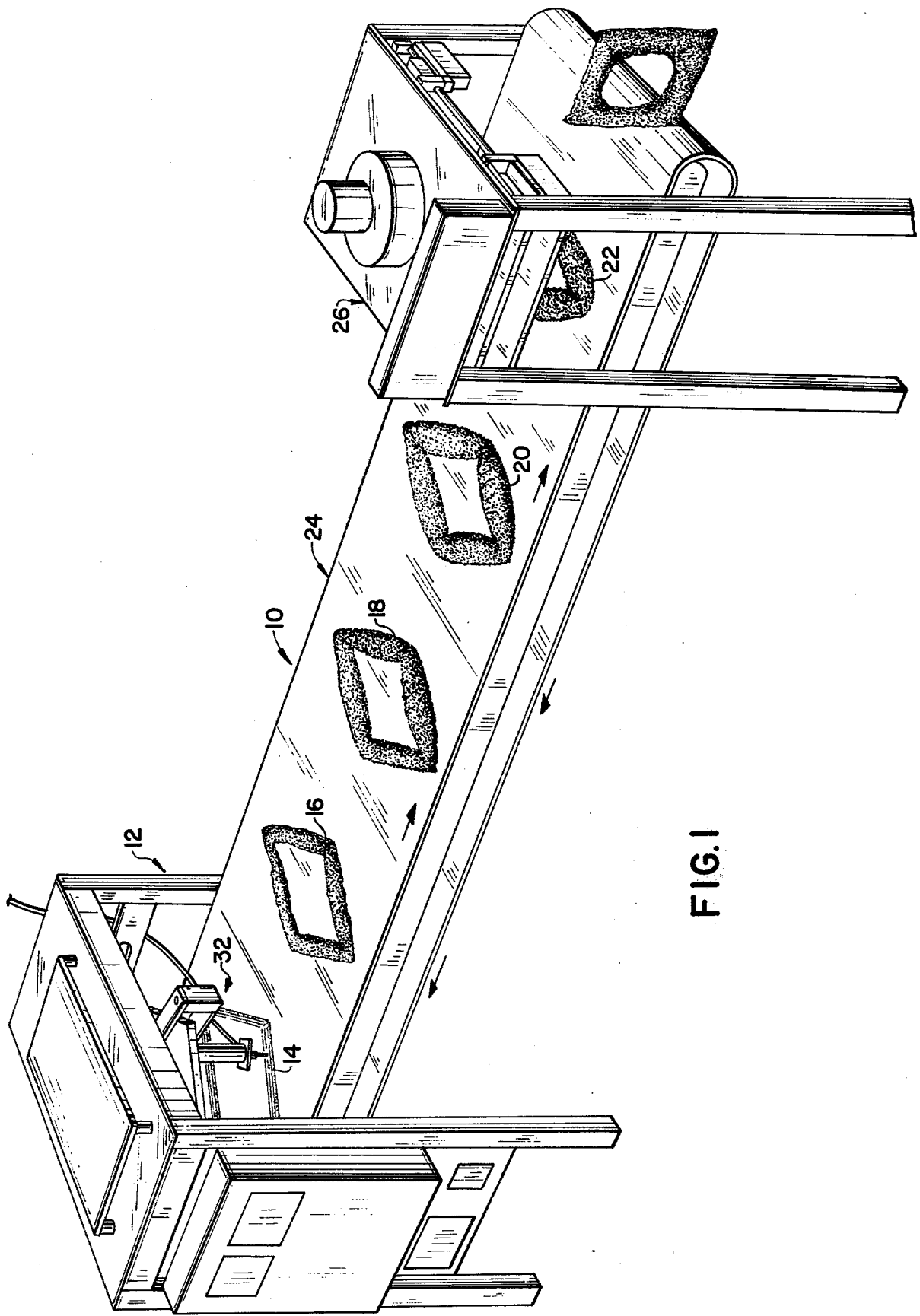
FIG. 1 is a perspective view of the apparatus for forming the cushions from foam material including the depositing station, the conveying apparatus, and the forming station.

Referring now to FIG. 1, there is shown the improved apparatus of the present invention, generally designated by the reference numeral 10, which includes a station 12 for depositing separate masses 14, 16, 18, 20, and 22 of foam plastic material, such as polyurethane, onto a conveying apparatus 24 for transferring the masses of material to a shaping and forming station 26.

Figure 2:
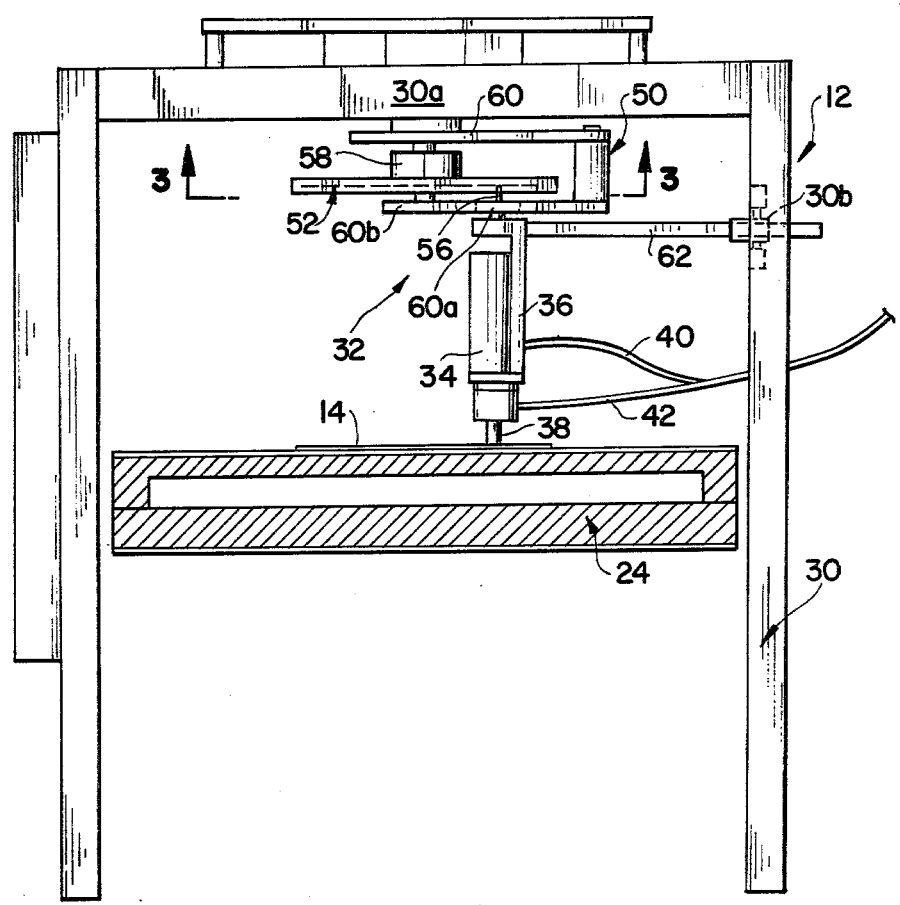
FIG. 2 is a side elevational view illustrating in detail the dispensing apparatus at the depositing station.
Figure 3:
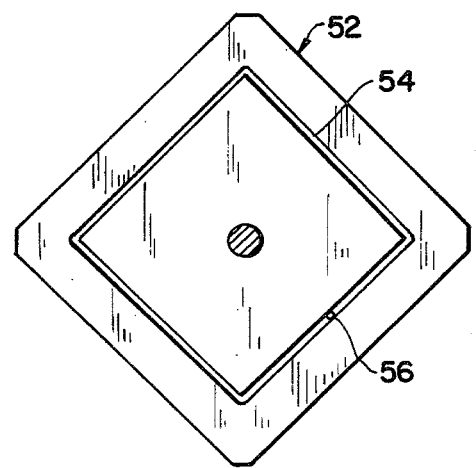
FIG. 3 is a bottom plan view taken on line 3—3 of FIG. 2 illustrating in detail the plate for controlling the movement of the dispensing apparatus for dispensing a mass of foam material having a predetermined configuration.
Figure 4:
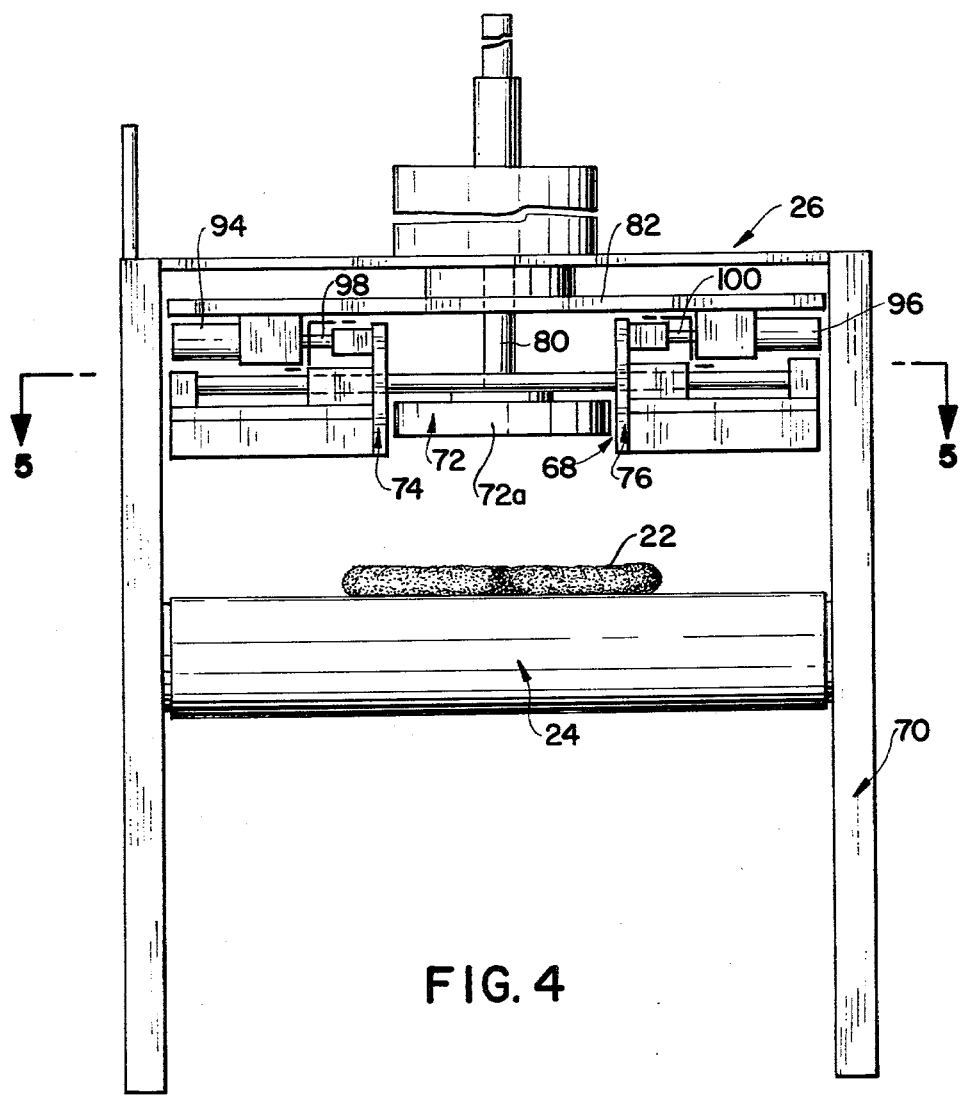
FIG. 4 is a side elevational view of the apparatus at the forming station for forming the separate masses of foam material into a desired predetermined configuration.

As shown in detail in FIG. 2, depositing station 12 includes a frame 30 for supporting the horizontally-moving conveyor 24 below dispensing apparatus 32. The dispensing apparatus 32 includes a mixing container 34 securely attached to a support member 36 for dispensing the foam plastic material via a suitable dispensing nozzle 38 onto conveyor 24. There are also shown supply lines 40, 42 for supplying the required materials to mixing container 34 which is used to mix and form the foam plastic material before it is dispensed via dispensing nozzle 38.

Mechanical control apparatus 50 is also provided to control the movement of the dispensing container 34 and nozzle 38 so that it dispenses the foam material into a predetermined configuration on the conveyor apparatus 24. Control apparatus 50 includes a control plate 52 having the desired pattern 54 formed therein. The pattern 54 is formed by a continuous slot in plate 52, and a pin member 56, extending upwardly from support member 36, is placed in slot 54 and is driven to follow the pattern defined by slot 54 so that dispensing apparatus 32 dispenses the foam material in the desired pattern on conveying apparatus 24. Control plate 52 is fixedly mounted on frame 30 by support members 58 extending downwardly from frame member 30a of frame 30. In addition, a U-shaped member or fork member 60 is rotatably supported on support members 58 and is employed to support and guide the movement of dispensing apparatus 32. As will be seen, pin 56 extends through a slot 60a formed in the lower leg 60b of fork member 60, and dispensing apparatus is thereby driven to rotate by fork member 60. Pin member 56 constrains the rotating dispensing apparatus 32 to follow the pattern 54 formed in the bottom of control plate 52. Therefore, slot 60a in fork member 60 is necessary so that dispensing apparatus 32 is free to move lineraly relative to form member 60 while fork member 60 is rotating so that the dispensing apparatus 32 can follow pattern 54. As will also be noted, dispensing apparatus 32 is connected to and supported by a transversely-reciprocating support member 62 which follows its movement, with the support member 62 transversely reciprocating relative to an opening 30b formed in frame 30.

As will be understood from the foregoing, dispensing apparatus 32 operates to deposit separate masses of foam material having the configuration controlled by pattern 54 in control plate 52 onto conveying apparatus 24. Referring now to FIG. 1, as the deposited masses of foam material 14, 16, 18, and 20 move along the conveying apparatus 24 to forming station 26, the masses of foam material rise to a tack-free state and reach substantially full expansion during a predetermined period of time. Typically, the time for a mass of foam material to be transferred from dispensing station 12 to forming station 26 should be about 15 to 20 seconds. Therefore, the speed of the conveying apparatus 24 and/or the distance between dispensing station 12 and forming station 26 can be adjusted to allow each mass of foam material after it is dispensed approximately 15 to 20 seconds to rise. Then, the expanded foam material reaches forming station 26 before the foam material sets so that it can be shaped and formed at forming station 26.

Referring now to FIGS. 4, 5, 6, and 7, the details of the forming apparatus 68 at forming station 26 are illustrated. The forming apparatus 68 is mounted on a frame 70 which also supports the conveying apparatus 24. Forming apparatus 68 includes force-applying members for pressing and shaping each of the masses of foam material into the desired predetermined configuration while on the conveying apparatus 24. In this embodiment, the force-applying members include a vertically-reciprocating force-applying member 72 and transversely-reciprocating forming members 74, 76. As will be understood, vertical-forming member 72 enters the hollow interior of the mass of foam material and engages its inner edges and presses them against the upper surface of conveying apparatus 24 to shape and form them. While the foam material is being shaped in this direction, forming members 74, 76 are operated to move transversely and engage the sides of the foam material and to press them against the sidewalls 72a of vertically-moving member 72, so that the mass of foam material is formed between inner member 72 and the surrounding outer members 74, 76.

Figure 5:
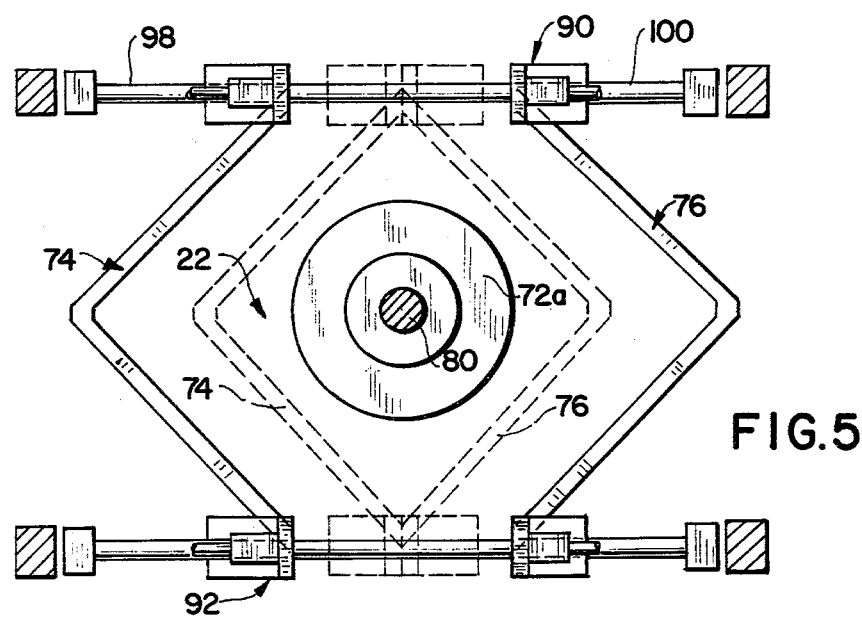
FIG. 5 is a top plan view of the forming apparatus shown in FIG. 4 illustrating the force-applying members in their open and closed positions.

As shown in detail in FIGS. 4, 5, 6, and 7, vertically-reciprocating force-applying members 72 includes a reciprocating piston member 80 connected to a frame support 82 and which is also connected at its lower end to press member 72a which is adapted to press each mass of foam material against the upper surface of conveying apparatus 24. In addition, transversely-reciprocating forming members 74, 76 are mounted on frame support 82 to cooperate with press member 72. More particularly, forming members 74, 76 are reciprocated downwardly with frame support 82, and as shown in FIG. 5, forming members 74, 76 are then reciprocated transversely between their open position, shown in solid lines, and their closed position, shown in dotted lines, by a pair of piston and cylinder arrangements 90, 92. As the constructions of members 90, 92 are identical, only arrangement 90 need be described in detail. Piston arrangement 90 includes cylinders 94, 96 and transversely-mounted driving pistons 98, 100, which are connected to the respective forming members 74, 76 to drive them between their open and closed positions. In addition, in order to guide the movement of forming members 74, 76, they are attached to carriages 110, 112 which slide on transversely-mounted guiding members 114, 116 for guiding the transverse movement of forming members 74, 76 between their open and closed positions.

Figure 6:
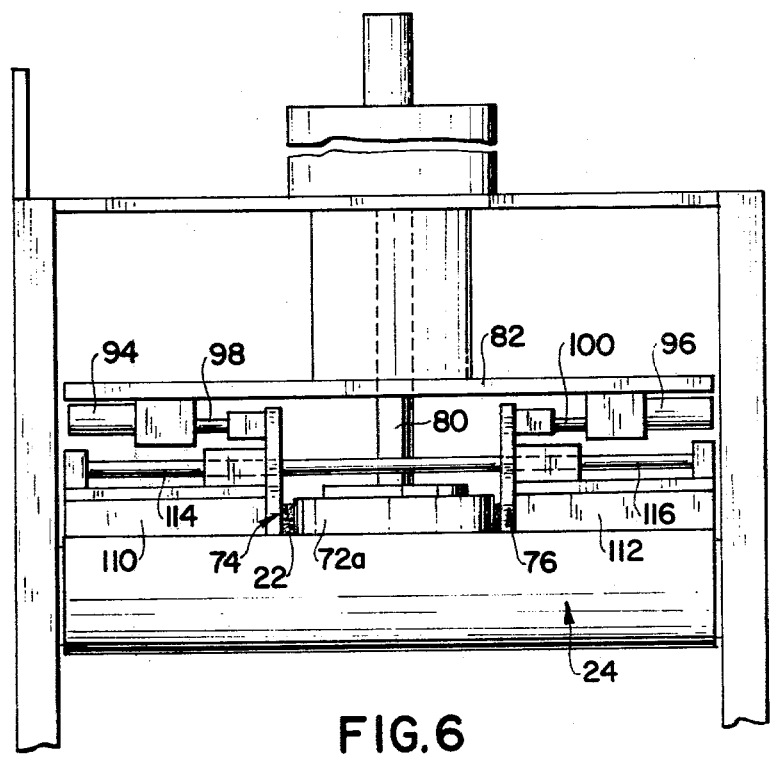
FIG. 6 is a side elevational view of the forming apparatus illustrating the vertically-moving force-applying members in their lowermost position.
Figure 7:
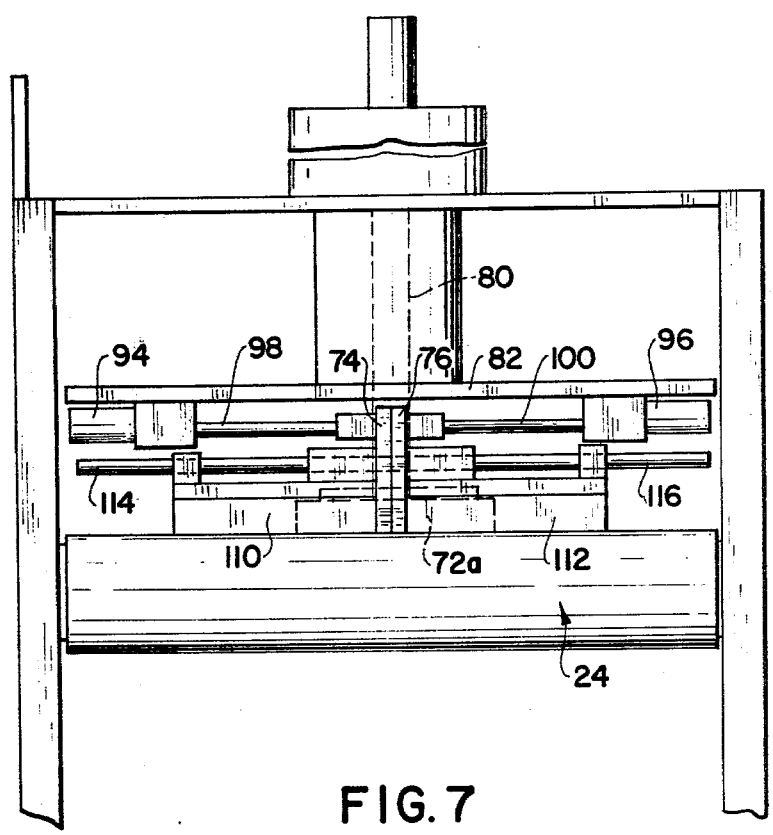
FIG. 7 is a side elevational view of the forming station illustrating in detail the force-applying members in their closed position.

In operation, as will be understood, when each mass of foam material reaches forming station 26, conveying apparatus 24 is stopped momentarily so that the forming operation can take place. As shown in FIG. 6, vertically-reciprocating force-applying member 72 is reciprocated downwardly so that press member 72a presses the mass of foam material 22 against the upper surface of conveying apparatus 24 to shape it in one direction. Simultaneously, forming members 74, 76 are reciprocated downwardly to the upper surface of conveying apparatus 24. Then, piston arrangements 90, 92 are operated to reciprocate forming members 74, 76 inwardly toward their closed positions and toward press member 72a to compress the mass of foam material 22 between central press member 72a and outer forming members 74, 76 to press and shape the mass of foam material into a predetermined configuration while on the upper surface of the conveying apparatus 24. Press member 72a and forming members 74, 76 are held in engagement with the mass of foam material until it is shaped and until the foam material has set. At this point, forming members 74, 76 are transversely retracted to their open positions. Then, press member 72a and the entire forming apparatus 72, 74, and 76 is vertically reciprocated to its upper position. At this point, the conveying apparatus 24 is operated to transfer the shaped foam material 22 to a receiving station where it is stored for usage. When the conveying apparatus 24 is operated, it also brings the next mass of foam material 20 into position at the forming station 26 to be formed and shaped and, simultaneously, removes the mass of material 14 from station 12. Then, the conveyor 24 is again stopped, and at depositing station 12, dispensing apparatus 32 operates to dispense a mass of foam material on the upper surface of conveying apparatus 24, having the predetermined configuration or pattern. Simultaneously, the mass of material 20 at forming station 26 is being formed and shaped.

In view of the foregoing, it will be appreciated that the present invention has provided a novel method and apparatus for forming cushions from foam plastic material, such as polyurethane, in a continuous manner, without the use of closed molds. As a result, the speed of producing such cushions is greatly increased, thereby lowering production costs and also resulting in savings, since the need for molds is eliminated.

As will also be understood, the foam material may be dispensed in any desired pattern or configuration, and it is only necessary to change the control plate 52 to have the desired pattern or slot 54 formed therein having the desired configuration. Although slot 54 has been shown rectangular in shape, it, of course, can be any shape, including elliptical, circular, triangular, or the like. In addition, in order to shape the masses of foam material into the desired pattern or configuration, the shape of forming members 72, 74, and 76 can be changed. Accordingly, press member 72a and forming members 74, 76 are removably attached to the forming apparatus 68. In this manner, these members can be easily removed, and new forming members having the desired shape or configuration can be removably attached to the forming apparatus to shape and form the masses of foam material into the desired configuration.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method of forming a product from foam material, comprising the steps of:
    dispensing separate masses of foam material onto a transfer surface at a depositing station, said dispensing being controlled so that said separate masses form a predetermined pattern of said foam material without the use of a mold,
    transferring said separate masses of foam material to a forming station,
    during said transferring operation, allowing said separate masses of foam material to rise to a tack-free state and to reach substantially full expansion, said transferring operation continuing for a predetermined period of time which is less than the time which it takes for said foam material to set,
    then, before said foam material sets, individually shaping each of said masses of said foam material at said forming station into a predetermined configuration by employing force-applying elements to press each of the masses of said foam material into said predetermined configuration while on said transfer surface and until said mass of foam material sets, and
    releasing said force-applying elements from said shaped mass of foam material.

2. A method in accordance with claim 1, wherein the step of allowing said separate masses of foam material to rise includes moving said masses of foam material from said depositing station to said forming station during a time interval which is less than 20 seconds.

3. A method in accordance with claim 1, wherein the step of shaping includes employing said force-applying elements to press each of said masses of foam material against said transfer surface.

4. A method in accordance with claim 1, wherein the step of shaping includes employing said force-applying elements to press said masses of foam material against said transfer surface in a first direction and employing said force-applying elements to press said masses of foam material into said predetermined configuration by moving said force-applying elements in a second direction, perpendicular to said first direction, to press and shape said masses of foam material.

5. A method in accordance with claim 1, wherein the step of depositing a mass of foam material at said depositing station is being performed simultaneously with the step of shaping a previously-deposited mass of material at said forming station.

6. A method in accordance with claim 1, wherein the step of transferring said masses of foam material includes the step of stopping said moving transfer surface so that a mass of material can be dispensed at said depositing station while a previously-deposited mass of material is being shaped at said forming station.

7. Apparatus for forming a product from foam material, comprising:
    means for dispensing said foam material onto a transfer surface at a depositing station as separate masses of foam material,
    means for controlling said dispensing means to move in a predetermined pattern to dispense said foam material in said predetermined pattern,
    means for moving said transfer surface and said masses of foam material from said depositing station to a forming station, while said masses of foam material rise to a tack-free state,
    said forming station including force-applying means for individually forming each of said masses of foam material into a predetermined configuration while on said transfer surface.

8. Apparatus in accordance with claim 7, wherein said force-applying means includes first means for pressing said masses of foam material in a first direction against said transfer surface and further includes second means for pressing said masses of foam material in a second direction, perpendicular to said first direction, to form said masses of foam material into said predetermined configuration.

9. Apparatus in accordance with claim 7, wherein said controlling means includes a control plate having a slot formed therein of a predetermined configuration for controlling the path of movement of said dispensing means.

10. Apparatus in accordance with claim 9, wherein said dispensing means includes means for following the slot in said control plate.

11. Apparatus in accordance with claim 8, wherein said first pressing means includes a vertically-reciprocating press member for pressing said foam material against said transfer surface.

12. Apparatus in accordance with claim 11, wherein said second pressing means includes transversely-reciprocating forming members for cooperating with said press member to shape said masses of foam material into said predetermined configuration.

13. Apparatus in accordance with claim 12, wherein said first and second pressing means include forming elements which are removably attached to said force-applying means.

* * * * *